Figure 1:
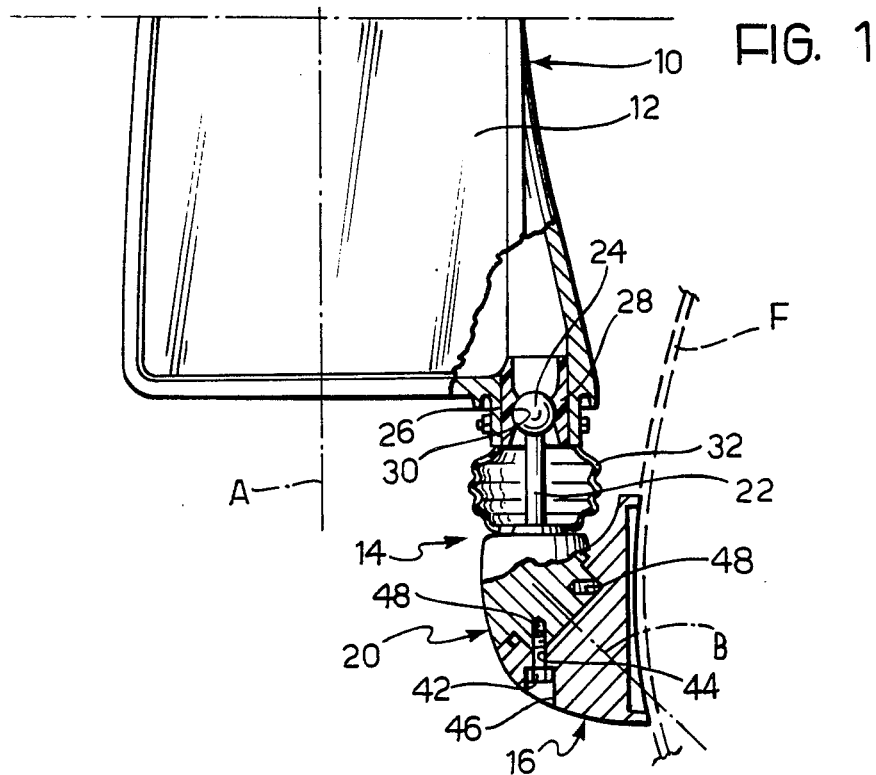

United States Patent [19]

Vitaloni

[11] Patent Number: 4,613,107
[45] Date of Patent: Sep. 23, 1986

[54] EXTERNAL REARVIEW MIRROR FOR MOTOR VEHICLES, WHICH CAN BE USED SELECTIVELY IN AN UPRIGHT POSITION AND IN A LATERALLY-PROJECTING POSITION

[75] Inventor: Alberto Vitaloni, Turin, Italy
[73] Assignee: Vitaloni S.p.A., Turin, Italy
[21] Appl. No.: 659,469
[22] Filed: Oct. 10, 1984

[30] Foreign Application Priority Data

Mar. 21, 1984 [IT] Italy ............................ 53160/84[U]

[51] Int. Cl.$^4$ .............................................. A47G 1/24
[52] U.S. Cl. ..................................... 248/481; 248/476
[58] Field of Search ...................... 248/481, 482, 475.1, 248/476, 477, 479; 403/160, 101; 350/604; 269/75

[56] References Cited

U.S. PATENT DOCUMENTS

| | | | |
|---|---|---|---|
| 3,734,447 | 5/1973 | Perison | 248/481 |
| 4,244,548 | 1/1981 | Sharp | 248/481 |
| 4,394,066 | 7/1983 | Sharp | 248/481 X |
| 4,504,165 | 3/1985 | Moeremans | 248/481 X |

Primary Examiner—Ramon O. Ramirez
Attorney, Agent, or Firm—Sughrue, Mion, Zinn, Macpeak, and Seas

[57] ABSTRACT

An external rearview mirror for motor vehicles comprises a base for attachment to one side of the vehicle body, a casing with an oblong reflecting sheet having a substantially major axis, and a support arm extending between the base and one side of the casing and incorporating a ball joint. The arm extends from a lower side corner zone of the casing in a direction substantially parallel to the major axis and, at its end corresponding to the base, includes a foot separate from the base. The base and the foot have means for coupling and fixing them together selectively in two positions at 180° to each other with respect to an inclined axis which, when the base is attached to the body, is located substantially in a vertical transverse plane relative to the direction of movement of the vehicle and is oriented upwardy and outwardly from the side of the body at substantially 45° to the horizontal.

8 Claims, 7 Drawing Figures

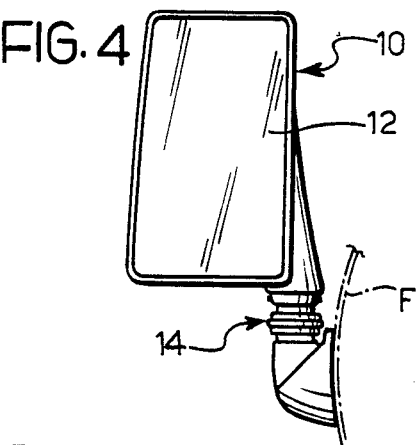
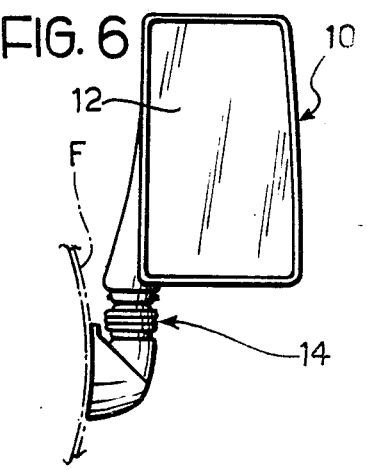
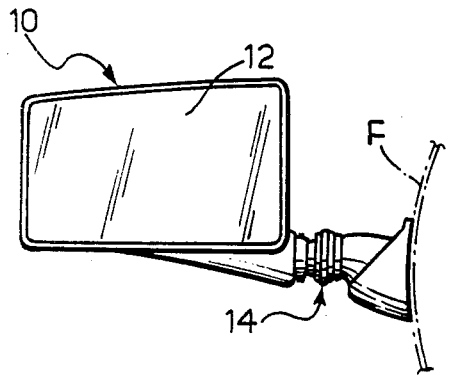
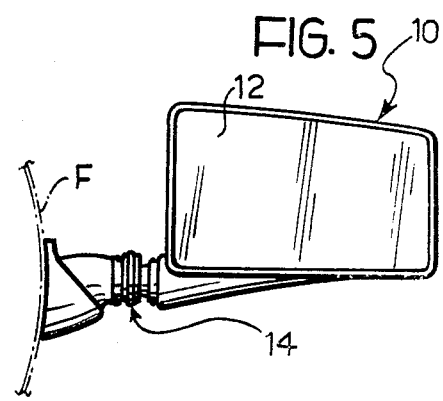
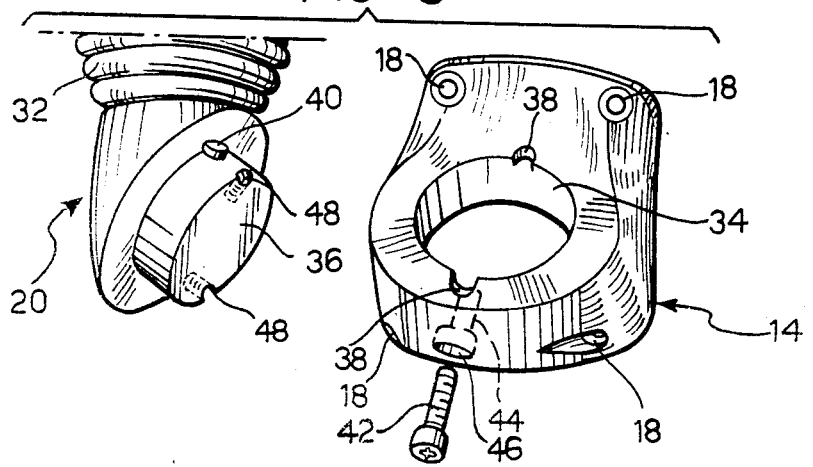

EXTERNAL REARVIEW MIRROR FOR MOTOR VEHICLES, WHICH CAN BE USED SELECTIVELY IN AN UPRIGHT POSITION AND IN A LATERALLY-PROJECTING POSITION

The present invention relates to an external rearview mirror for motor vehicles, of the type comprising a base for attaching it to one side of the vehicle body, a casing with an oblong reflecting sheet having a substantially major axis, and a support arm extending between the base and one side of the casing and incorporating a ball joint.

The object of the invention is to provide a rearview mirror of this type which, according to need or preference, can be used selectively in an upright position and in a position projecting laterally of the vehicle body.

According to the present invention this object is achieved by means of an external rear-view mirror of the type mentioned at the beginning, characterised in that the arm extends from a lower side corner zone of the casing in a direction substantially parallel to the major axis and, at its end corresponding to the base, includes a foot separate from the base itself, and in that the base and the foot have means for coupling and fixing them together selectively in two positions at 180° to each other with respect to an inclined axis which, when the base is attached to the body, is located substantially in a vertical transverse plane relative to the direction of movement of the vehicle and is oriented upwardly and outwardly from the side of the body at substantially 45° to the horizontal.

A rearview mirror according to the invention is particularly suitable for use on vehicles such as vans, campers, motor caravans and the like. Such vehicles are equipped with a pair of external rearview mirrors, a right-hand one and a left-hand one.

As will be better understood from the description which refers to the drawings, an upright or "vertical" left-hand mirror may be converted into a projecting or "horizontal" right-hand mirror, while an upright or "vertical" right-hand mirror may be converted into a projecting or "horizontal" left-hand mirror. These conversion operations may be effected easily and rapidly by the user at any desired time.

Since the mirror is intended especially for vehicles which are equipped with a pair of mirrors, a left-hand one and a right-hand one, the fact that the same mirror cannot be converted from upright to horizontal and vice versa without moving it from one side of the vehicle to the other is not an inconvenience.

Figure 2:
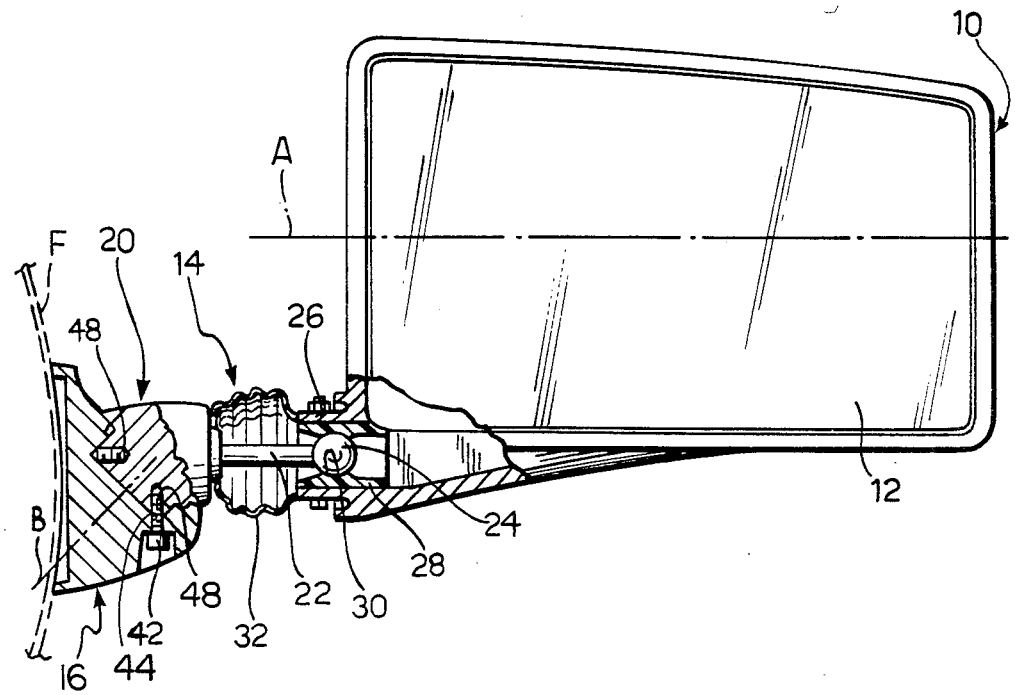

The invention will now be explained by the following detailed description made with reference to the appended drawings, given purely by way of non-limiting example, in which:

FIG. 1 is a partially-sectioned elevational view of a mirror according to the invention used as an upright left-hand mirror, FIG. 2 is a similar view to that of FIG. 1 of the same mirror used as a projecting right-hand mirror, FIG. 3 is an exploded perspective view of the base for attachment of the mirror to the body and of the foot which can be coupled with the base, FIGS. 4 and 5 are views corresponding respectively to FIGS. 1 and 2 on an enlarged scale, and FIGS. 6 and 7 are similar views of a mirror which is the twin of that of FIGS. 4 and 5 in its two positions of use.

With reference to FIGS. 1 and 2, a rearview mirror comprises a casing 10 preferably of moulded plastics material. The casing 10 has been shown with a substantially rectangular or trapezoidal shape but may have any desired oblong shape. This oblong has a substantially major axis A.

The casing 10 houses a reflecting sheet 12 with an outline shape which corresponds to that of the casing itself.

The casing 10 has a support arm, generally indicated 14. The arm 14 extends in a direction substantially parallel to the major axis A from a corner zone of the casing 10, which is in a lower side position in both FIG. 1 and FIG. 2.

As will be explained below, the arm 14 is secured releasably to a plastics or metal base 16 for attachment to the body.

The side of the body to which the base 16 is fixed is indicated F.

The base has, for example, holes 18 for fixing screws.

At its end corresponding to the base 16, the arm 14 includes a foot 20 which is separate from the base and can be of metal or plastics material. A column 22 extends from the foot 20 and terminates with a ball 24.

At the said lower side zone, the casing 10 has a tubular projecting portion 26 formed integrally therewith. The tubular portion 26 houses a tubular insert 28 of friction material, which has a spherical seat 30 in which the ball 24 is retained in a frictional manner to articulate the arm 14 and thus allow the usual adjustment of the mirror.

The foot 20 and the portion 26 are connected by a bellows sleeve 32 which surrounds the column 22.

Referring now to FIGS. 1 to 3, the base 14 is formed with a substantially cylindrical socket 34 the axis of which is indicated B in FIGS. 1 and 2.

The base 16 is intended to be fixed to the side F of the body so that the axis B is located substantially in a transverse vertical plane relative to the direction of movement of the vehicle and is inclined upwardly and outwardly from the side F at substantially 45° to the horizontal.

The foot 20 is formed with a cylindrical projection 36 complementary to the socket 34. The projection 36 and the socket 34 can be coupled and uncoupled by movements along the inclined axis B.

The socket 34 has a pair of diametrally opposed notches or grooves 38 at its mouth. The projection 36 has a tooth or rib 40 selectively engageable in one notch 38 or the other.

As will be understood, the notches 38 and the teeth 40 constitute means for keying the foot 20 selectively in two positions at 180° to the inclined axis B. The disposition of the keying means is such as to allow the keying of the foot 20 to the base 14 in two positions corresponding respectively to the upright or "vertical" attitude of the mirror on the left-hand side of the vehicle, as shown in FIGS. 1 and 4, and the projecting or "horizontal" attitude on the right-hand side of the vehicle, as shown in FIGS. 2 and 7.

The change of positions may be effected with the bases 16 still fixed to the respective sides of the vehicle.

The fixing of the foot 20 in the selected position of coupling with the base 16 is achieved by means of a screw indicated 42 in FIGS. 1 to 3.

In order to allow the insertion of the screw 42, the base 16 has a through-hole 44 which extends from one of its lower faces and opens into the socket 34 at the junction between the side surface and the base of the socket. The hole 44 has an enlarged mouth 46 for receiving the head of the screw 42, which preferably has an internal-hexagon head.

The axis of the hole 44 is conveniently at an angle of about 45° to the axis B.

The projection 36 is formed with a pair of screw-threaded holes 48 inclined from its edge like the through-hole 44 and so disposed that one or other is in alignment with the through-hole according to whether the foot 20 is oriented as in FIG. 1 or as in FIG. 2. Thus, when the screw 42 is screwed into one of the holes 48, it keeps the projection 36 firmly engaged in the socket 34 and holds the mirror in one attitude or other as desired.

Up to now a mirror has been described which may be converted from the left-hand upright configuration (FIGS. 1 and 4) to the right-hand projecting configuration (FIGS. 2 and 5). What has been described also holds for a mirror having the opposite disposition, that is, one which can be converted from the right-hand upright configuration (FIG. 6) to the left-hand projecting configuration (FIG. 7).

If a pair of twin mirrors are provided on the same motor vehicle, these mirrors may be used in the disposition illustrated in FIGS. 4 and 6 or in that illustrated in FIGS. 5 and 7, these having been shown side by side so as to make them immediately understandable.

A pair of twin mirrors according to the invention is preferably formed so that the parts of each mirror are exactly the same, apart from their casings 10 and reflecting sheets 12 which are mirror images.

Naturally, the details of the present model may be varied while remaining within the scope of the model itself. Thus, the means for coupling and fixing the attachment base and the foot together, which form part of the arm, may have different configurations from those illustrated as long as they allow the selective coupling and fixing together of the base and the foot in two positions at 180° to each other relative to the inclined axis indicated B.

Moreover, although an attachment base with a socket and a foot with a projection have been shown, this arrangement could be reversed.

I claim:

1. An external rearview mirror for motor vehicles, comprising a base for attachment to one side of the vehicle body, a casing with an oblong reflecting sheet having a substantially major axis, and a support arm extending between the base and one side of the casing and incorporating a ball joint, wherein the arm extends from a lower side corner zone of the casing in a direction substantially parallel to the major axis and, at its end corresponding to the base includes a foot separate from the base and wherein the base and the foot have means for coupling and fixing them together selectively in two positions at 180° to each other with respect to an inclined axis which, when the base is attached to the body, is located substantially in a vertical transverse plane relative to the direction of movement of the vehicle and is oriented upwardly and outwardly from the side of the body at substantially 45° to the horizontal.

2. A rearview mirror as claimed in claim 1, wherein the coupling means include a socket and a complementary projection formed respectively in the base and on the foot, or vice versa, the projection and the socket being able to be coupled and uncoupled by movements along the inclined axis and having formations for keying them together in the two selective positions, and wherein the fixing means include a screw for clamping the foot to the base in the coupled position.

3. A rearview mirror as claimed in claim 2, wherein the element in which the socket is formed has a through-hole which extends from an outer accessible surface of the element and opens into the socket, and the projection has a pair of screw-threaded holes located so as to be aligned alternatively with the through-hole in the selective coupling positions for receiving the clamping screw inserted from the exterior of the element.

4. A rearview mirror as claimed in claim 3, wherein the said holes are each at an angle substantially 45° to the inclined axis.

5. A rearview mirror as claimed in claim 3, wherein the socket is formed in the base and the projection is formed on the foot, and wherein the through-hole in the base opens to the exterior in a lower zone of the base.

6. A rearview mirror as claimed in claim 1, wherein the arm includes a tubular portion formed integrally with the casing, a column extending from the foot and terminating with a ball, an insert of friction material housed in the tubular portion and having a spherical seat in which the ball is retained by friction, and a bellows sleeve which connects the foot and the tubular portions and surrounds the column.

7. A rearview mirror as claimed in claim 2 wherein the socket and the projection have generally corresponding forms, the socket having keying notches or grooves and the projection having keying ribs or teeth selectively engageable in the notches or grooves.

8. A rearview mirror as claimed in claim 3 wherein the socket and the projection have generally corresponding forms, the socket having keying notches or grooves and the projection having keying ribs or teeth selectively engageable in the notches or grooves.

* * * * *